H. R. ADAMS.
VALVE.
APPLICATION FILED MAR. 3, 1910.
982,109.
Patented Jan. 17, 1911.
2 SHEETS—SHEET 1.
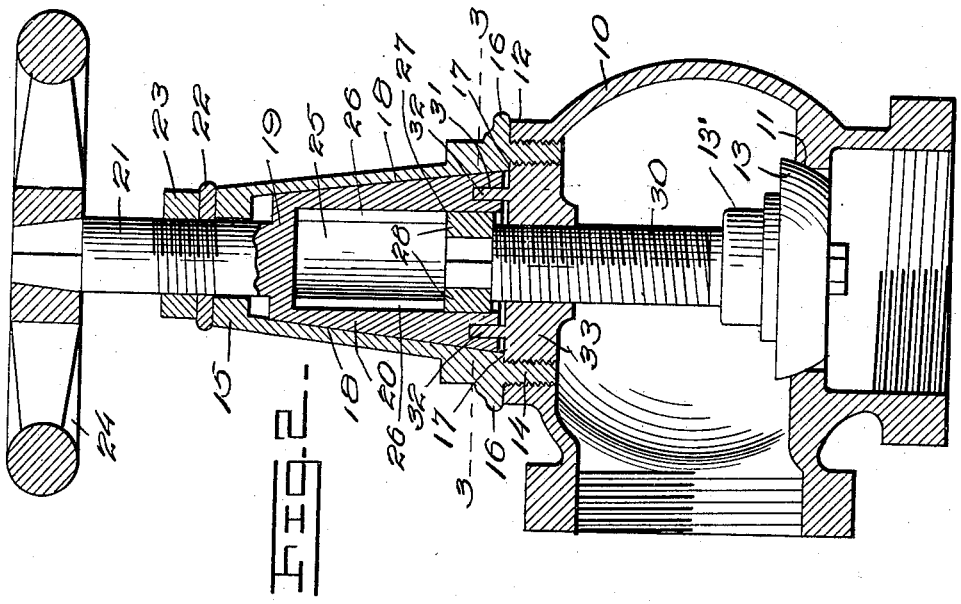
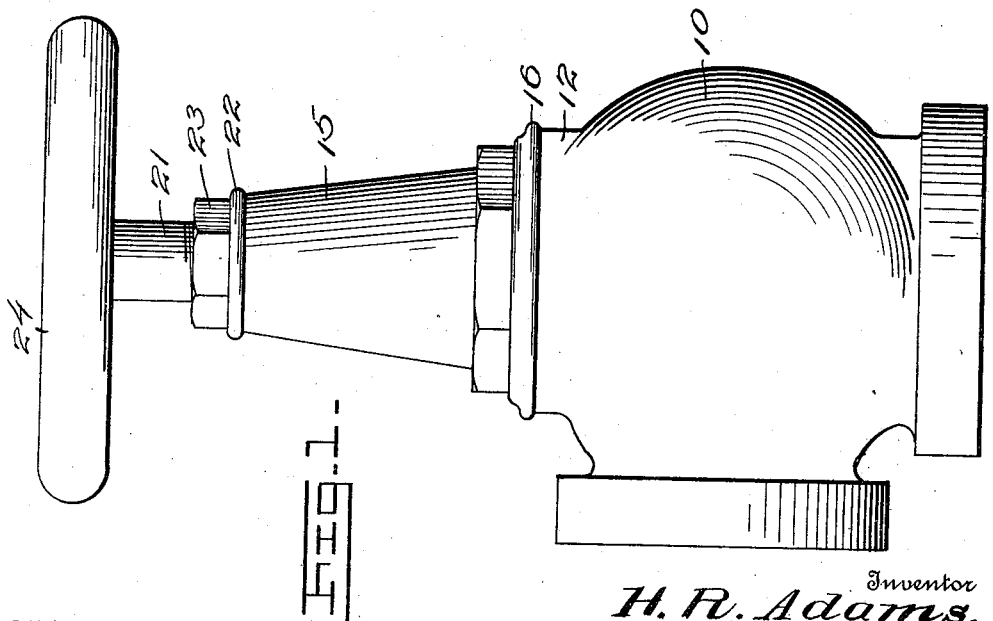

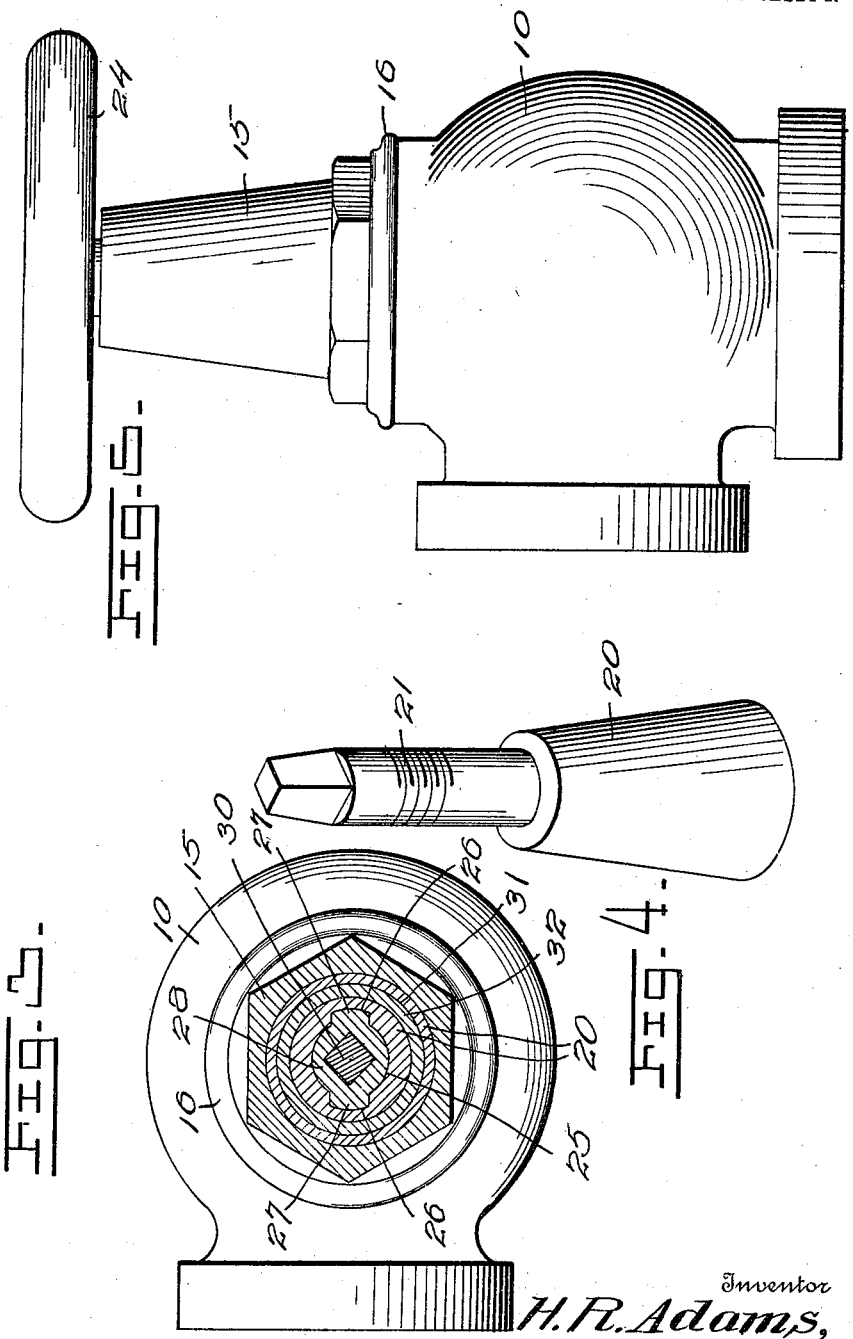

UNITED STATES PATENT OFFICE.

HENRY R. ADAMS, OF BRIDGEPORT, CONNECTICUT.

VALVE.

982,109.

Specification of Letters Patent.  Patented Jan. 17, 1911.

Application filed March 3, 1910.  Serial No. 547,085.

*To all whom it may concern:*

Be it known that I, HENRY R. ADAMS, a citizen of the United States, residing at Bridgeport, in the county of Fairfield and State of Connecticut, have invented certain new and useful Improvements in Valves, of which the following is a specification.

This invention relates to valves of the globe type, and more particularly to an improvement in means for obviating the necessity for packing around the stems thereof, and has for its object to provide a stem requiring no packing, and in which the escape of fluid controlled thereby will be positively prevented.

A further object is to simplify the construction of the device in a way to cheapen its manufacture.

A further important object is to reduce the comparative size and length of the stem required, as well as the hub therefor, so that the device will occupy a minimum amount of space and be readily manipulable in confined environment.

A further object accomplished is the provision of means for supporting the valve itself independently of the operating stem, so that the pressure of fluid controlled thereby will not be exerted directly thereupon and retard its operation. In addition, the bridge member used for supporting the valve is adjustable to support the operating stem which is of frusto conical shape, snugly disposed in a ground similarly shaped seat in the hub, whereby the positive seating of the valve stem and elimination of the escape of fluid is accomplished.

Other objects and advantages will be apparent from the following description, and it will be understood that changes in the specific structure shown and described may be made within the scope of the claim without departing from the spirit of the invention.

In the drawings: Figure 1 is an exterior side view of the valve, Fig. 2 is a longitudinal sectional view therethrough, Fig. 3 is a cross section on the line 3—3 of Fig. 2, Fig. 4 is a perspective view of the operating stem, detached. Fig. 5 is an exterior view of a modified form of the valve.

Referring to the drawings, there is shown a valve comprising the usual casing 10 having the usual seat 11 which may be located at any desirable point in the valve according to the form of connections. In registry with the seat, the valve is provided with the interiorly threaded boss 12 presenting a suitable opening for the introduction of the valve member 13 seated upon the seat 11, and having screwed thereinto the interiorly and exteriorly threaded flange 14 of the hub member 15. The hub is provided with a lateral flange 16 abutting snugly against the boss 12, and also the inwardly projecting shoulder 17, from which extends outwardly the conical ground seat 18 arranged for the reception of the operating stem 19, as will be subsequently described.

The stem 19 comprises the approximately frusto-conical portion 20 snugly engaged in the seat 18, and having the integral outwardly projecting shank 21, suitably threaded and having a collar threaded thereon and abutting against the outer end of the hub and secured by means of a suitable lock nut 23. By means of the collar 22 and nut 23, the stem may be adjusted to compensate for wear of the frusto-conical member and its seat. The outer extremity of the stem 19 may be provided with the usual hand wheel 24 or other suitable means for rotation thereof. It will be noted that the stem 21 is considerably smaller than the upper end of the frusto conical portion 20, and formed in the conical portion there is the longitudinally extending cylindrical bore 25, opening through the base of the portion 20, being approximately of the same diameter as the stem 21 and its inner end stopping short of the upper end of the conical portion 20, as shown in Fig. 2. The bore 25 is provided with diametrically opposed guide channels 26 extending longitudinally and arranged to receive the projecting arms 27 of an angularly apertured head 28 secured upon the upper end of the lower threaded stem 30, the upper end thereof being angular and snugly engaged in the angular opening of the head 28. An annular groove 31 is formed concentrically in the base of the upper stem a spaced distance outward of the bore and channels thereof, and receives snugly an annular flange 32, carried upon a bridge member 33 threaded within the flange 14, and having a central threaded passage therethrough receiving the stem 30 for support of the stem. The bridge 33 is screwed into the flange 14 a sufficient distance to closely seat the flange 32 in the groove 31, whereby access of sediment to the stem seat is prevented, allowing easy movement thereof, and a suitable means is used (not shown) to hold the bridge in adjusted position. The valve head 13 may be secured to the lower end of the stem 30 in any suitable manner, and as will be apparent, will be moved away from or toward the valve seat 11 upon rotation of the hand wheel 24 in the proper direction. Upon rotation of this wheel, the arms 27 of the heads 28 carried upon the lower stem 30 are engaged by the sides of the channels 26, and rotated. The stem 30 being threaded in the stationary bridge 33 is thus caused to reciprocate longitudinally in the bore 25, and the threaded portion may be projected to the full depth of the bore, its movement thereinto being checked by the engagement of the supporting boss 13' of the clapper valve head 13 against the bridge 33. This is an important improvement, for the lower valve stem is allowed to reciprocate for a considerable distance, and when at the outer limit of its movement there is but little space outwardly thereof occupied by the hub portion of the device, its size thus being reduced to a minimum. Indeed, the hub is practically the same size as the stuffing box of the usual globe valve. When the valve stem is unscrewed to the fullest extent, and the boss 13' is forced snugly against the bridge, a water tight joint is effected preventing any seepage while the valve is open.

It will be seen that a minimum number of elements are required in the construction of this device, and its assemblage may be accomplished with a minimum expenditure of labor, so that it may be manufactured and sold at a very low cost.

In Fig. 5 there is shown a modification of the device in which the nut and collar 22 and 23 are omitted, whereby the size of the valve is considerably reduced.

In use, it will be seen that the entire pressure exerted against the valve head will be supported by the bridge 33, and in the event that any fluid escapes through the bridge and around the shank 30 its force will be communicated to the portion 20 of the upper stem, which will thus be forced more securely into its seat, closing the only path of egress for the fluid. By the independent support of the lower stem upon the bridge, when the valve is firmly seated, the frusto-conical portion of the stem cannot be wedged in its seat and operation of the valve prevented by the friction thus produced. Thus the effective operation of the device is assured with a minimum amount of effort.

What is claimed is:

A valve comprising in combination a seat portion, a hub member spaced therefrom and provided with a frusto-conical seat axially registering with said first named seat, a valve movable into and out of engagement with the first named seat and having a threaded stem, a bridge member having a threaded aperture receiving said stem and carried rigidly in the hub, said stem having a cross head member, said bridge having a concentric annular flange, and a frusto-conical member seated in said second named seat and having an angular axial passage therethrough receiving said cross head member for rotation of the stem and having also an annular groove receiving said annular flange, said frusto-conical member having an operating stem projecting outwardly of the hub, and means for rotation thereof.

In testimony whereof I affix my signature, in presence of two witnesses.

HENRY R. ADAMS.

Witnesses:
JOHN F. HOLDEN,
WILLARD F. HALLETT.